(12) United States Patent
Morioka

(10) Patent No.: US 9,992,370 B2
(45) Date of Patent: Jun. 5, 2018

(54) DOUBLE-SIDED IMAGE READING DEVICE AND IMAGE FORMING DEVICE

(71) Applicant: Konica Minolta, Inc., Chiyoda-ku, Tokyo (JP)

(72) Inventor: Toshimitsu Morioka, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/350,189

(22) Filed: Nov. 14, 2016

(65) Prior Publication Data

US 2017/0149995 A1 May 25, 2017

(30) Foreign Application Priority Data

Nov. 24, 2015 (JP) ................................. 2015-228545

(51) Int. Cl.
*H04N 1/04* (2006.01)
*H04N 1/00* (2006.01)
*H04N 1/12* (2006.01)

(52) U.S. Cl.
CPC ....... *H04N 1/0464* (2013.01); *H04N 1/00588* (2013.01); *H04N 1/00602* (2013.01);
(Continued)

(58) Field of Classification Search
CPC ............. H04N 1/0464; H04N 1/00588; H04N 1/00602; H04N 1/00615
(Continued)

(56) References Cited

U.S. PATENT DOCUMENTS 5,026,044 A * 6/1991 Ryon .................. G03B 27/625
271/227
5,033,731 A * 7/1991 Looney ................. B65H 43/08
271/176
(Continued)

FOREIGN PATENT DOCUMENTS

JP 2002-368952 A 12/2002
JP 2004-007229 A 1/2004
(Continued)

OTHER PUBLICATIONS

Office Action (Notice of Reason for Rejection) dated Dec. 12, 2017 by the Japanese Patent Office in corresponding Japanese Patent Application No. 2015-228545 and English Translation of the Office Action. (24 pages).

*Primary Examiner* — Cheukfan Lee
(74) *Attorney, Agent, or Firm* — Buchanan Ingersoll & Rooney PC

(57) ABSTRACT

A double-sided image reading device that reads an image on a first side of a document when the document that is being delivered through a feeding path passes a first reading part and thereafter reads an image on a second side of the document opposite to the first side when the document passes a second reading part, the double-sided image reading device including: an S-shaped path provided between the first reading part and the second reading part of the feeding path and including a lower end of a first curved path in a document feeding direction and an upper end of a second curved path curved to the side opposite to the first curved path in the document feeding direction connected to each other; and a pressing guide configured to press the document that is being delivered through the first curved path.

19 Claims, 7 Drawing Sheets

(52) U.S. Cl.
CPC ....... *H04N 1/00615* (2013.01); *H04N 1/1225* (2013.01); *H04N 2201/0081* (2013.01); *H04N 2201/0094* (2013.01)

(58) Field of Classification Search
USPC ........................................ 358/498, 496, 408
See application file for complete search history.

(56) References Cited

U.S. PATENT DOCUMENTS

| | | | | |
|---|---|---|---|---|
| 5,731,882 | A * | 3/1998 | Kawamura | H04N 1/32379 341/159 |
| 5,741,009 | A * | 4/1998 | Kawano | B65H 29/22 271/182 |
| 5,833,381 | A * | 11/1998 | Kellogg | B41J 13/00 271/274 |
| 6,147,778 | A * | 11/2000 | Yamada | H04N 1/0315 358/474 |
| 6,170,821 | B1 * | 1/2001 | Kubota | B65H 7/04 271/176 |
| 6,394,447 | B1 * | 5/2002 | Kawai | B65H 15/00 271/185 |
| 7,021,618 | B2 * | 4/2006 | Watanabe | B65H 5/38 271/10.11 |
| 7,212,751 | B2 * | 5/2007 | Kayama | G03G 15/6552 399/21 |
| 7,370,861 | B2 * | 5/2008 | Aoyagi | B65H 31/10 271/176 |
| 7,539,446 | B2 * | 5/2009 | Deguchi | G03G 15/165 399/316 |
| 7,589,871 | B2 * | 9/2009 | Yoshimoto | H04N 1/00814 358/408 |
| 7,609,423 | B2 * | 10/2009 | Sano | H04N 1/00702 271/285 |
| 7,677,557 | B2 * | 3/2010 | Ino | B65H 31/26 271/207 |
| 7,865,127 | B2 * | 1/2011 | Nakajima | G03G 15/6576 271/176 |
| 8,295,757 | B2 * | 10/2012 | Matsushima | B65H 29/60 399/367 |
| 8,480,078 | B2 * | 7/2013 | Kubota | B65H 29/26 270/58.07 |
| 8,508,820 | B2 * | 8/2013 | Honma | B65H 5/062 358/496 |
| 8,614,839 | B2 * | 12/2013 | Sano | H04N 1/00588 358/461 |
| 9,272,868 | B2 * | 3/2016 | Hamada | G03G 15/602 |
| 2001/0033761 | A1 * | 10/2001 | Takida | G03G 15/60 399/367 |
| 2002/0098023 | A1 * | 7/2002 | Mitomi | H04N 1/0057 399/374 |
| 2005/0087920 | A1 * | 4/2005 | Takamatsu | B65H 3/0684 271/10.01 |
| 2005/0147438 | A1 * | 7/2005 | Nose | G03G 15/602 399/367 |
| 2005/0162712 | A1 * | 7/2005 | Shiraishi | H04N 1/02815 358/474 |
| 2005/0206968 | A1 * | 9/2005 | Sodeura | H04N 1/00002 358/474 |
| 2005/0213167 | A1 * | 9/2005 | Shiraishi | H04N 1/02815 358/474 |
| 2006/0061839 | A1 * | 3/2006 | Hiraoka | H04N 1/0464 358/498 |
| 2006/0110197 | A1 * | 5/2006 | Nose | B65H 9/00 399/367 |
| 2007/0002401 | A1 * | 1/2007 | Park | H04N 1/12 358/498 |
| 2007/0052149 | A1 * | 3/2007 | Matsushima | B65H 5/06 271/3.14 |
| 2007/0052150 | A1 * | 3/2007 | Iwago | H04N 1/00572 271/4.01 |
| 2007/0063420 | A1 * | 3/2007 | Seike | B65H 3/06 271/109 |
| 2007/0064252 | A1 * | 3/2007 | Iwago | G03G 15/605 358/1.12 |
| 2007/0069451 | A1 * | 3/2007 | Iwago | H04N 1/00572 271/186 |
| 2007/0076271 | A1 * | 4/2007 | Shirai | H04N 1/00572 358/498 |
| 2007/0085258 | A1 * | 4/2007 | Iwago | H04N 1/00572 271/3.14 |
| 2007/0086816 | A1 * | 4/2007 | Iwago | G03G 15/602 399/367 |
| 2007/0097411 | A1 * | 5/2007 | Kondo | H04N 1/00846 358/1.14 |
| 2007/0103740 | A1 * | 5/2007 | Shingai | H04N 1/00572 358/498 |
| 2007/0103741 | A1 * | 5/2007 | Suzuki | H04N 1/00572 358/498 |
| 2007/0153325 | A1 * | 7/2007 | Mizumukai | H04N 1/00572 358/1.15 |
| 2007/0153339 | A1 * | 7/2007 | Itoh | H04N 1/00068 358/498 |
| 2007/0194520 | A1 * | 8/2007 | Kusama | B65H 5/062 271/225 |
| 2007/0201113 | A1 * | 8/2007 | Nishikawa | H04N 1/0057 358/506 |
| 2007/0247676 | A1 * | 10/2007 | Tsai | H04N 1/125 358/496 |
| 2007/0264062 | A1 * | 11/2007 | Jinza | G03G 15/607 399/367 |
| 2008/0169602 | A1 * | 7/2008 | Shingai | B65H 7/02 271/265.03 |
| 2008/0266617 | A1 * | 10/2008 | Suzuki | H04N 1/4076 358/474 |
| 2008/0285097 | A1 * | 11/2008 | Kitagawa | H04N 1/0057 358/498 |
| 2008/0304116 | A1 * | 12/2008 | Lee | H04N 1/121 358/498 |
| 2010/0014902 | A1 * | 1/2010 | Tokutsu | G03G 15/60 399/372 |
| 2010/0109226 | A1 * | 5/2010 | Kitazawa | B65H 5/24 271/3.14 |
| 2010/0123282 | A1 * | 5/2010 | Miyakoshi | B65H 5/38 271/3.19 |
| 2010/0165368 | A1 * | 7/2010 | Matsuoka | H04N 1/401 358/1.9 |
| 2011/0007370 | A1 * | 1/2011 | Kitazawa | B65H 5/26 358/498 |
| 2011/0199653 | A1 * | 8/2011 | Nishikawa | H04N 1/00909 358/483 |
| 2011/0292475 | A1 * | 12/2011 | Matsuda | H04N 1/1215 358/498 |
| 2012/0038101 | A1 * | 2/2012 | Osaki | B65H 31/26 271/209 |
| 2012/0113484 | A1 * | 5/2012 | Kobayashi | H04N 1/1225 358/475 |
| 2012/0193867 | A1 * | 8/2012 | Nagao | B65H 31/02 271/207 |
| 2013/0228964 | A1 * | 9/2013 | Kurokawa | B65H 3/0684 271/117 |
| 2013/0256986 | A1 * | 10/2013 | Umeno | B65H 7/06 271/228 |
| 2013/0265620 | A1 * | 10/2013 | Matsumoto | H04N 1/00615 358/498 |
| 2013/0321885 | A1 * | 12/2013 | Adachi | H04N 1/00588 358/498 |
| 2013/0342882 | A1 * | 12/2013 | Takahashi | H04N 1/00615 358/498 |
| 2014/0084531 | A1 * | 3/2014 | Fukumoto | B65H 3/06 271/10.1 |
| 2014/0168731 | A1 * | 6/2014 | Nakayoshi | H04N 1/00588 358/498 |
| 2014/0177012 | A1 * | 6/2014 | Kubo | H04N 1/123 358/474 |
| 2014/0226191 | A1 * | 8/2014 | Enomoto | H04N 1/00588 358/496 |
| 2015/0085330 | A1 * | 3/2015 | Suese | H04N 1/00782 358/488 |

(56) References Cited

U.S. PATENT DOCUMENTS

| | | | |
|---|---|---|---|
| 2015/0183598 A1* | 7/2015 | Suganuma | B65H 3/0684 |
| | | | 358/498 |
| 2015/0183601 A1* | 7/2015 | Suganuma | B65H 5/36 |
| | | | 271/3.18 |
| 2015/0264194 A1* | 9/2015 | Kubo | H04N 1/00572 |
| | | | 358/1.12 |
| 2015/0281514 A1* | 10/2015 | Kita | H04N 1/00572 |
| | | | 358/448 |
| 2016/0023857 A1* | 1/2016 | Nakata | B65H 5/062 |
| | | | 271/227 |
| 2016/0119501 A1* | 4/2016 | Kii | H04N 1/401 |
| | | | 358/486 |
| 2016/0360046 A1* | 12/2016 | Katayama | H04N 1/0057 |
| 2016/0366295 A1* | 12/2016 | Matsumoto | H04N 1/00588 |
| 2017/0041490 A1* | 2/2017 | Lee | H04N 1/121 |
| 2017/0070626 A1* | 3/2017 | Ikeda | H04N 1/00554 |

FOREIGN PATENT DOCUMENTS

| | | |
|---|---|---|
| JP | 2004-354422 A | 12/2004 |
| JP | 2006-13852 A | 1/2006 |
| JP | 2013-234074 A | 11/2013 |
| JP | 2015-82716 A | 4/2015 |

\* cited by examiner

| | DIFFERENCE IN TIP INCLINATION α (%) BETWEEN FRONT SIDE AND BACK SIDE OF DOCUMENT |
|---|---|
| EXAMPLE | 0.0008 |
| COMPARATIVE EXAMPLE 1 | 0.1894 |
| COMPARATIVE EXAMPLE 2 | 0.2185 |
| MODIFICATION 1 | 0.0014 |

DOUBLE-SIDED IMAGE READING DEVICE AND IMAGE FORMING DEVICE

The entire disclosure of Japanese Patent Application No. 2015-228545 filed on Nov. 24, 2015 including description, claims, drawings, and abstract are incorporated herein by reference in its entirety.

BACKGROUND OF THE INVENTION

Field of the Invention

The present invention relates to a double-sided image reading device for reading images on both sides of a document while the document is being delivered, and an image forming device.

Description of the Related Art

Double-sided image reading devices for reading images on both sides of a document that is being delivered have been developed as image reading devices such as a scanner.

A double-sided image reading device generally has a first reading unit to one side and a second reading unit to the other side with a feeding path of a document therebetween so that an image on a first side (front side) of the document is read by the first reading unit when the document that is being delivered passes a first reading part of the first reading unit and an image on a second side (back side) of the document is read by the second reading unit when the document after passing the first reading part passes a second reading part of the second reading unit.

As a double-sided image reading device as described above, one in which a part between the first reading part and the second reading part of a feeding path of a document is a path with S-shape (hereinafter referred to as "S-shaped path") when seen from side (when seen from the document width direction orthogonal to the feeding direction of a document D) has been proposed.

FIG. 9 illustrates a schematic structure of a double-sided image reading device including an S-shaped path.

As illustrated in FIG. 9, in a double-sided image reading device, a document D on a document tray 930 is supplied to a feeding path 940 by a pick-up roller 901, and the supplied document D is fed toward a first reading part 921 by a separation roller 902, a registration roller 903, and a feeding roller 904 along the feeding path 940. Then, an image on a first side of the document D is read by a first reading unit 911 when the document D that is being fed passes the first reading part 921.

The document D after passing the first reading part 921 is fed toward a second reading part 922 located above the first reading part 921 by a feeding roller 905. A part between the first reading part 921 and the second reading part 922 corresponds to an S-shaped path 950.

The S-shaped path 950 generally has a structure in which a lower end of a first curved path 951 in the document feeding direction that is curved obliquely upward toward the downstream from the upstream of the document feeding direction is connected to an upper end of a second curved path 952 in the document feeding direction that is curved toward the side opposite to the first curved path 951.

When the document D that has been delivered through the S-shaped path 950 passes the second reading part 922, an image on the second side of the document D is read by a second reading unit 912. Then, the document D that has passed the second reading part 922 is delivered by a feeding roller 906 and discharged to a discharge tray 931 by a discharge roller 907.

However, a structure including such an S-shaped path 950 has a problem that skew of the document D easily occurs while it is being delivered through the S-shaped path 950.

Specifically, although a tip of the document D in the feeding direction that is being delivered (hereinafter simply referred to as "tip") Df reaches a guide 961 forming the first curved path 951 immediately after passing over the first reading part 921 in the substantially horizontal direction, since the guide 961 rises obliquely upward, the feeding direction is forced to be changed to obliquely upward when the document D contacts with the guide 961. A frictional force due to contact with the guide 961 is applied to the tip Df of the document D.

If the areas from the one end to the other end of the tip Df of the document D in the document width direction equally contact with the guide 961 when the tip Df of the document D is guided to the guide 961, there will be no significant difference in frictional force (feeding resistance) between the one end and the other end in the document width direction.

However, due to vibration while delivery propagating to the document D and vibration when the tip Df of the document D contacts with the guide 961, the tip Df of the document D sometimes flutters up and down and right and left.

If the document D continues to be guided along the guide 961 while such flutter is occurring, one end of the document D in the document width direction contacts with the guide 961 and the other end of the document D does not contact with the guide 961 or one end of the document D does not contact with the guide 961 and the other end of the document D contacts with the guide 961. Therefore, there will be a difference in frictional force, that is, feeding resistance, between the one and the other end in the document width direction and the document D tends to incline toward the direction where the feeding resistance is large.

If the tip Df of the document D reaches the feeding roller 905 while skew is occurring, the document D is delivered to the second reading part 922 by the feeding roller 905 with the skew kept and an image on the second side of the document D is read with the skew kept.

When an image on the second side of the document D is read with the skew kept, the entire read image inclines with the inclined angle according to the level of the skew and the quality of the read image for the second side of the document D is decreased if the read image is printed on a sheet or displayed on a display of a personal computer.

In addition, for example, if few skew occurs to the document D when an image on the first side of the document D is read and skew occurs when an image on the second side of the same document D is read, only the read image of the second side is inclined. If this happens, the read images on the first side and the second side of one document D seem to be imbalance to the user when the read image on the first side is compared with the read image on the second side, which leads to bad-looking.

SUMMARY OF THE INVENTION

The present invention has been developed in consideration of the problems mentioned above, and an object of the present invention is to provide a double-sided image reading device that can prevent occurrence of skew to a document that is being delivered through an S-shaped path, and an image forming device including the double-sided image reading device.

To achieve the abovementioned object, according to an aspect, a double-sided image reading device that reads an image on a first side of a document when the document that is being delivered through a feeding path passes a first reading part and thereafter reads an image on a second side of the document opposite to the first side when the document passes a second reading part, reflecting one aspect of the present invention comprises: an S-shaped path provided between the first reading part and the second reading part of the feeding path and including a lower end of a first curved path in a document feeding direction and an upper end of a second curved path curved to the side opposite to the first curved path in the document feeding direction connected to each other; and a pressing guide configured to press the document that is being delivered through the first curved path.

The double-sided image reading device preferably further comprises a feeding guide that faces the pressing guide with the document that is being delivered in between, wherein at least a part of the first curved path is preferably formed by the feeding guide and the pressing guide, and the pressing guide preferably presses the document that passes between the pressing guide and the feeding guide against the feeding guide.

In the double-sided image reading device, the pressing guide preferably has a part a distance from which to the feeding guide becomes narrower from an upstream side toward a downstream side of the document feeding direction, and the pressing guide preferably presses the document against the feeding guide at a part at the downstream side of the document feeding direction where the distance to the feeding guide becomes the narrowest.

In the double-sided image reading device, the pressing guide preferably uses at least one of own weight and a biasing force of a biasing member as a pressing force for pressing the document against the feeding guide.

The double-sided image reading device preferably further comprises a pick-up guide provided to a downstream side of the document feeding direction with respect to the first reading part and an upstream side of the document feeding direction with respect to the feeding guide, wherein the pick-up guide preferably picks up the document that has passed the first reading part and causes the document to move toward the feeding guide.

In the double-sided image reading device, the first curved path preferably includes a first path part where the document that has passed the first reading part is picked up by the pick-up guide and a second path part between the part where the document is picked up by the pick-up guide and a lower end of the first curved path in the document feeding direction, and a curvature of the second path part is preferably larger than that of the first path part.

In the double-sided image reading device, the feeding guide is preferably a guide outside a curve of the first curved path and the pressing guide is a guide inside the curve of the first curved path.

The double-sided image reading device preferably further comprises a feeding rotational member that is provided in the middle of the S-shaped path and feeds the document that is being delivered through the S-shaped path toward a downstream side of the document feeding direction, wherein the pressing guide is preferably provided at an upstream side of the document feeding direction with respect to the feeding rotational member.

In the double-sided image reading device, the first curved path preferably includes a first path part and a second path part that is provided at a downstream side of the document feeding direction with respect to the first path part and has a curvature different from that of the first path part, and the pressing guide preferably presses the document that is being delivered through the path part with a larger curvature.

The double-sided image reading device preferably further comprises a registration roller pair that is provided at an upstream side of the document feeding direction with respect to the first reading part of the feeding path and eliminates skew of the document that is fed toward the first reading part.

To achieve the abovementioned object, according to an aspect, an image forming device reflecting one aspect of the present invention forms an image on a sheet on the basis of image data of a document read by a double-sided image reading unit, wherein the double-sided image reading unit reads an image on a first side of the document when the document that is being delivered through a feeding path passes a first reading part and thereafter reads an image on a second side of the document opposite to the first side when the document passes a second reading part, and the double-sided image reading unit comprises: an S-shaped path provided between the first reading part and the second reading part of the feeding path and including a lower end of a first curved path in a document feeding direction and an upper end of a second curved path curved to the side opposite to the first curved path in the document feeding direction connected to each other; and a pressing guide configured to press the document that is being delivered through the first curved path.

In the image forming device, the double-sided image reading unit preferably further comprises a feeding guide that faces the pressing guide with the document that is being delivered in between, at least a part of the first curved path is preferably formed by the feeding guide and the pressing guide, and the pressing guide preferably presses the document that passes between the pressing guide and the feeding guide against the feeding guide.

In the image forming device, the double-sided image reading unit preferably has a part where a distance between the pressing guide and the feeding guide becomes narrower from an upstream side toward a downstream side of the document feeding direction, and the pressing guide preferably presses the document against the feeding guide at a part at the downstream side of the document feeding direction where the distance to the feeding guide becomes the narrowest.

In the image forming device, in the double-sided image reading unit, the pressing guide preferably uses at least one of own weight and a biasing force of a biasing member as a pressing force for pressing the document against the feeding guide.

In the image forming device, the double-sided image reading unit preferably further comprises a pick-up guide provided to a downstream side of the document feeding direction with respect to the first reading part and an upstream side of the document feeding direction with respect to the feeding guide, and the pick-up guide preferably picks up the document that has passed the first reading part and causes the document to move toward the feeding guide.

In the image forming device, in the double-sided image reading unit, the first curved path preferably includes a first path part where the document that has passed the first reading part is picked up by the pick-up guide and a second path part between the part where the document is picked up by the pick-up guide and a lower end of the first curved path in the document feeding direction, and a curvature of the second path part is preferably larger than that of the first path part.

In the image forming device, in the double-sided image reading unit, the feeding guide is preferably a guide outside a curve of the first curved path and the pressing guide is a guide inside the curve of the first curved path.

In the image forming device, the double-sided image reading unit preferably further comprises a feeding rotational member that is provided in the middle of the S-shaped path and feeds the document that is being delivered through the S-shaped path toward a downstream side of the document feeding direction, and the pressing guide is preferably provided at an upstream side of the document feeding direction with respect to the feeding rotational member.

In the image forming device, in the double-sided image reading unit, the first curved path preferably includes a first path part and a second path part that is provided at a downstream side of the document feeding direction with respect to the first path part and has a curvature different from that of the first path part, and the pressing guide preferably presses the document that is being delivered through the path part with a larger curvature.

In the image forming device, the double-sided image reading unit preferably further comprises a registration roller pair that is provided at an upstream side of the document feeding direction with respect to the first reading part of the feeding path and eliminates skew of the document that is fed toward the first reading part.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Embodiments of an image forming device including a double-sided image reading device according to the present invention will be described below with reference to the drawings with an example being a multi-function peripheral (hereinafter referred to as "MFP").

<Entire Structure of MFP>

Figure 1:
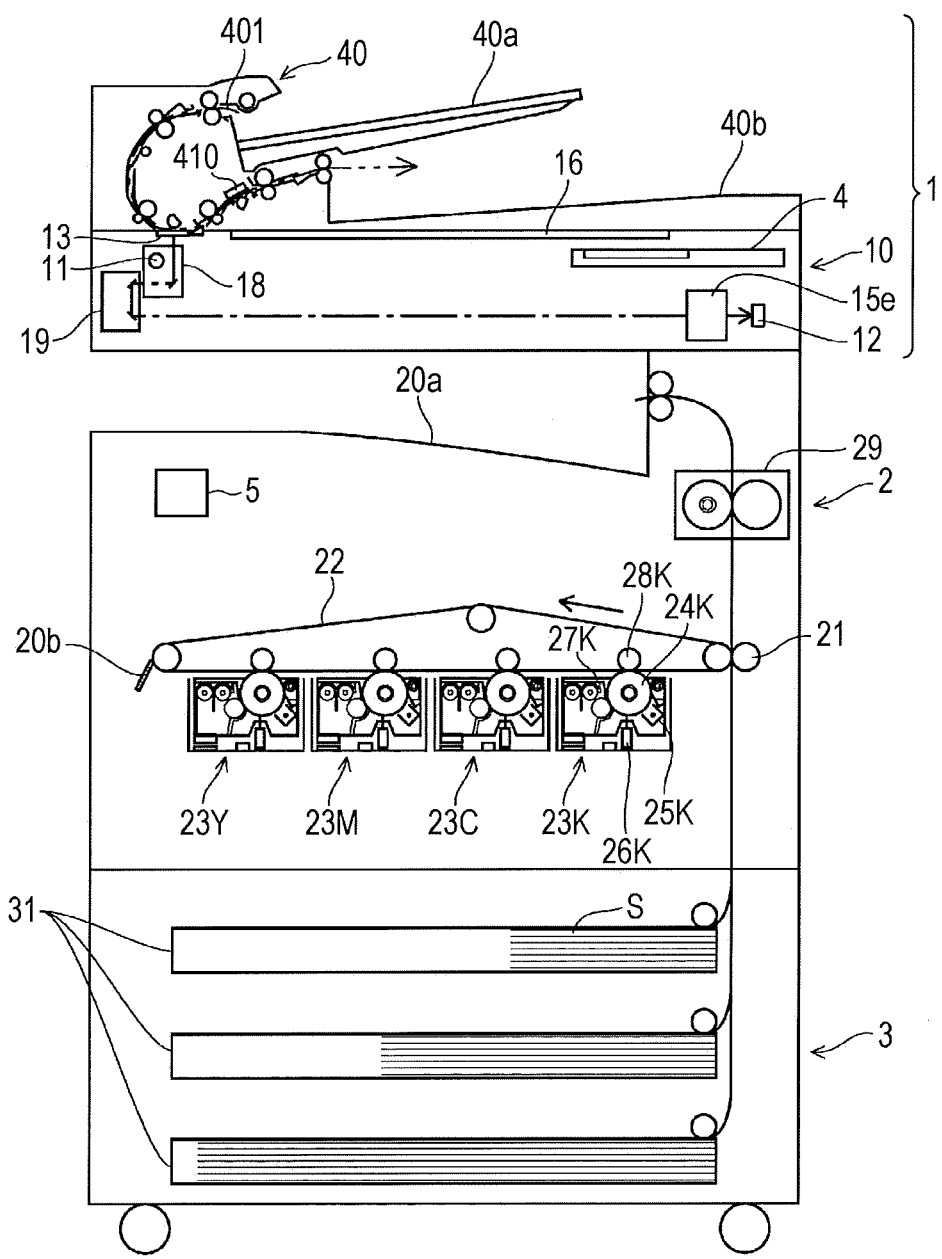
FIG. 1 is a schematic view illustrating a structure of an MFP according to an embodiment.

FIG. 1 is a schematic view illustrating a structure of an MFP according to the present embodiment.

As illustrated in FIG. 1, the MFP includes an image reading device 1, an image forming unit 2, a document feeding unit 3, an operation unit 4, and a general control unit 5.

The image reading device 1 can read a document image by sheet through type that is one of fixed optical systems and by scanner movement type that is one of moving optical systems. Here, the sheet through type is a type for reading a document that is being delivered (moved) by a fixed reading part with the optical system remaining still (fixed). The scanner movement type is a type for reading a document by moving a mirror guiding reflected light from the document surface to a reading sensor toward the document with the document remaining still and by keeping the optical path length between the document surface and the reading sensor always constant.

The image reading device 1 according to the present embodiment is a so-called one-pass double-sided image reading device of sheet through type that can sequentially read images on the front side and the back side of one document during one delivery. Hereinafter, the front side of the document D is referred to as first side and the back side opposite to the first side is referred to as second side.

In the sheet through type, the user can select one side reading mode in which an image on one side of a document is read, double side reading mode in which images on both sides of a document are read, and the like. Detailed reading operations in sheet through type and scanner movement type will be described later.

The image forming unit 2 forms an image on the basis of the image data read by the image reading device 1, and includes an intermediate transcription belt 22, imaging units 23Y, 23M, 23C, and 23K, a fixing unit 29, and the like.

The imaging unit 23Y, 23M, 23C, and 23K are arranged along the intermediate transcription belt 22, and each of them forms a toner image of yellow (Y), magenta (M), cyan (C), and black (K) respectively. Since the imaging units 23Y to 23K has the same structure, description will be given for only the imaging unit 23K and description for other imaging units 23Y to 23C will be omitted.

The imaging unit 23K includes a photoreceptor drum 24K, a charger 25K, an exposure unit 26K, a development unit 27K, and a primary transcript roller 28K. The outer periphery of the photoreceptor drum 24K is equally charged by the charger 25K. The exposure unit 26K emits light beam toward the photoreceptor drum 24K by a driving signal based on the image data read by the image reading device 1 and forms an electrostatic latent image on the photoreceptor drum 24K by exposing and scanning the surface of the charged photoreceptor drum 24K.

The electrostatic latent image formed on the outer periphery of the photoreceptor drum 24K is developed by a toner by the development unit 27K and the toner image is electrostatically transferred on the intermediate transcription belt 22 by the primary transcript roller 28K. Toner images of each color of Y to K are transferred on the intermediate transcription belt 22 on one another and toner images of color are formed.

While toner images are being formed, the document feeding unit 3 pulls out sheets S one by one from one of several paper feeding cassettes 31 contained inside, and feeds the sheets S to a secondary transcript position where a secondary transcript roller 21 is provided. The secondary transcript roller 21 electrostatically transfers the toner image on the intermediate transcription belt 22 on the sheet S.

For the sheet S on which the toner image is transferred, after the toner image is fused and pressed on the sheet S by heating and pressure by the fixing unit 29, and the sheet S is discharged on a discharge tray 20*a*. Residual toner that remains on the intermediate transcription belt 22 without being transferred to the sheet S is removed by a cleaner 20*b*.

The operation unit 4 is located at a position where the user can easily operate, accepts selection of reading mode of a document, an instruction to start reading, and the like from the user, and notifies the accepted input information to the general control unit 5.

The general control unit 5 controls the image reading device 1, the image forming unit 2, and the document feeding unit 3 to execute a job based on the information input by the user. For example, when double side reading mode of a document is selected by the user, the general control unit 5 controls the image reading device 1 to cause it to feed the document by sheet through type and to read images on the first side and the second side of the document during delivery.

<Structure of Image Reading Device>

Figure 2:
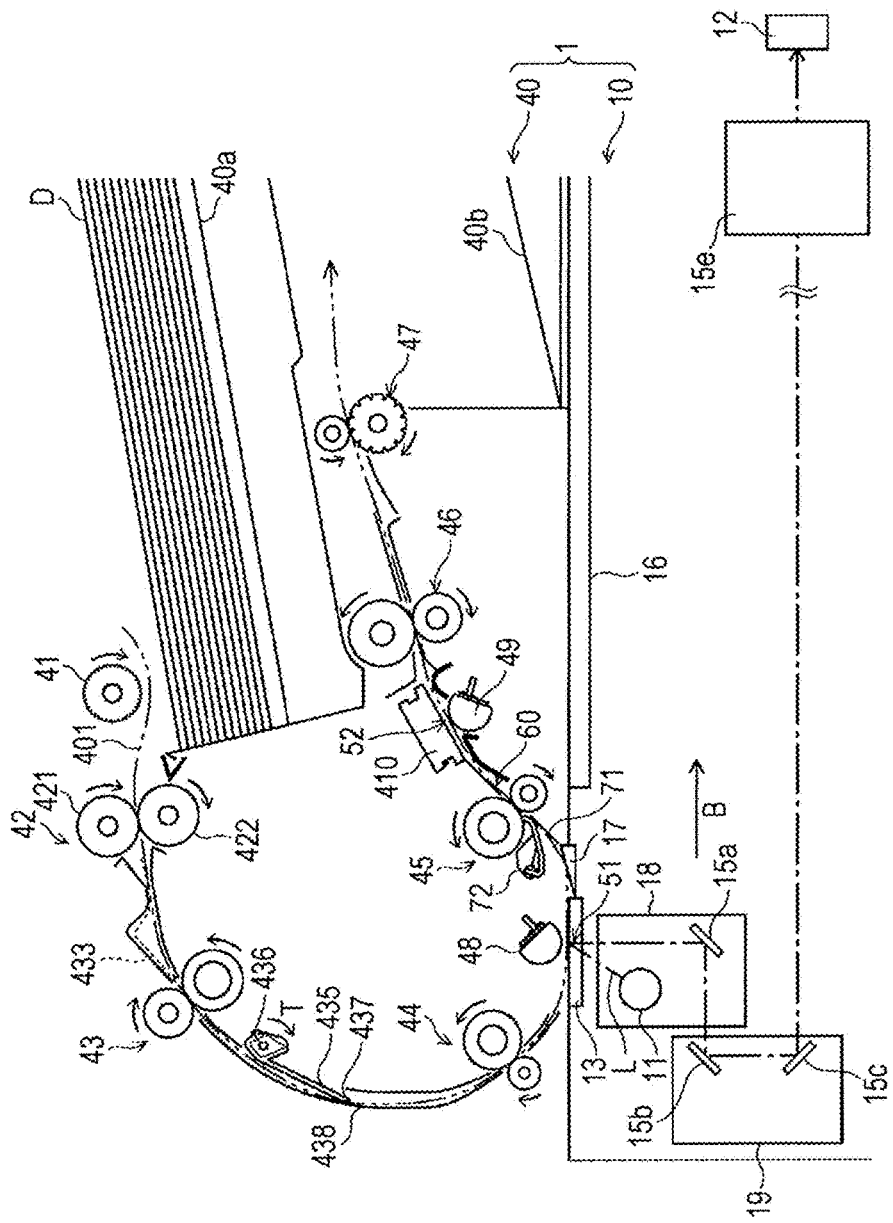
FIG. 2 is a side view illustrating a schematic structure of an image reading device included in the MFP.

FIG. 2 is a side view illustrating a schematic structure of the image reading device 1.

As illustrated in FIG. 2, the image reading device 1 includes an image reading unit 10 with a glass for sheet through 13 and a platen glass 16 provided to the upper part thereof and an automatic document feeder (ADF) 40 provided above the image reading unit 10.

<Structure of Image Reading Unit>

The image reading unit 10 includes a first slider 18 having a lamp 11 and a first mirror 15*a*, a second slider 19 having a second mirror 15*b* and a third mirror 15*c*, a condensing lens 15*e*, and a CCD (Charge Coupled Device) sensor 12 serving as a reading sensor.

When a document is read by sheet through type, the image reading unit 10 reads an image on the first side of the document D (side of the document D opposite to the glass for sheet through 13) when the document D fed by the automatic document feeder 40 passes over the glass for sheet through 13.

Specifically, the first slider 18 is moved to the position immediately below the glass for sheet through 13 (sheet through position) and stopped. Then, the lamp 11 is turned on and light L from the lamp 11 is emitted toward the first side of the document D that passes over the glass for sheet through 13.

The path of the reflected light from the first side of the document D is changed by the first mirror 15*a*, the second mirror 15*b*, and the third mirror 15*c*, and an image is formed on an acceptance surface of the CCD sensor 12 by the condensing lens 15*e*. The CCD sensor 12 generates image data corresponding to the image on the first side of the document D from the received light by photoelectric conversion, and transmits the image data to the image forming unit 2.

In this regard, the image reading unit 10 is a first reading unit for reading an image on the first side of the document D in sheet through type and a position 51 where the light L from the lamp 11 is emitted to the first side of the document D is a first reading part for reading an image on the first side of the document D.

On the other hand, when a document is read by scanner movement type, the first slider 18 is moved to the direction indicated by an arrow B in FIG. 2 while the lamp 11 is on with the automatic document feeder 40 opened upward by the user and the document placed on the platen glass 16. When the first slider 18 is moved, the second slider 19 is moved to the same direction as the first slider 18 at the speed half as the moving speed of the first slider 18. Accordingly, the reflected light of the document forms an image on the acceptance surface of the CCD sensor 12 with the distance (optical path length) between the document placed on the platen glass 16 and the condensing lens 15*e* kept always constant.

<Structure of Automatic Document Feeder>

When a document image is read by sheet through type, the automatic document feeder 40 feeds the documents D placed on a document feeding tray 40*a* one by one along a document feeding path 401, and discharges the documents D to a document discharge tray 40*b* after they pass over the glass for sheet through 13.

Specifically, the documents D placed on the document feeding tray 40*a* are supplied to the document feeding path 401 by a supply roller 41 and fed to a separation roller pair 42.

The separation roller pair 42 includes a paper feeding roller 421 and a handling roller 422 that face each other, and the documents D fed between the paper feeding roller 421 and the handling roller 422 are separated as each sheet to be delivered to a registration roller pair 43 by reverse rotation of the paper feeding roller 421 and the handling roller 422 at a position where they face each other.

The registration roller pair 43 is stopped when the tip of the document D has arrived and begins to rotate at a predetermined timing after a loop 433 (broken line) is formed on the document D at the upstream side of the feeding direction of a part (nip) where one registration roller contacts with the other registration roller, and inclination of the tip of the document D is corrected.

The loop 433 of the document D is formed by continuous application of a feeding force to the rear end of the feeding direction of the document D by the separation roller pair 42 while advance of the tip of the document D is prevented since the tip of the document D enters the nip of the registration roller pair 43 in a halt state until rotation of the registration roller pair 43 is started at the predetermined timing.

Because of strong body of the document D, a restoring force to move back to flat posture before forming the loop is applied to the part where the loop 433 is formed, and the tip of the document D is pushed to the nip of the registration roller pair 43 by the restoring force. With such a pressing force, entire area of the tip of the document D in the width direction enters the nip of the registration roller pair 43, and skew is resolved even if skew is occurring at the tip of the document D.

With the start of rotation of the registration roller pair 43, the document D is fed toward a first feeding roller pair 44 by the registration roller pair 43. Here, a pressing guide 435 is provided between the registration roller pair 43 and the first feeding roller pair 44. The pressing guide 435 has a function similar to that of a pressing guide 72 described later, specifically, a function to prevent occurrence of skew to the document D that is being delivered. The structure of the pressing guide 435 will be described later.

The first feeding roller pair 44 delivers the document D supplied from the registration roller pair 43 toward the glass for sheet through 13. A reading guide 48 is provided above the glass for sheet through 13 with a distance from the glass for sheet through 13.

The document D delivered by the first feeding roller pair 44 passes between the surface of the glass for sheet through 13 and the reading guide 48. An image on the first side of the document D is read by the image reading unit 10 when the document D passes between the surface of the glass for sheet through 13 and the reading guide 48.

The document D that has passed over the glass for sheet through 13 is guided to a feeding guide 71 by a pick-up guide 17 and fed to a second feeding roller pair 45 after passing between the feeding guide 71 and the pressing guide 72.

The second feeding roller pair 45 (feeding rotation member) further applies a feeding force toward the downstream side in the document feeding direction to the document D that has passed over the glass for sheet through 13, and feeds the document D toward a contact image sensor (CIS) 410.

A reading guide 49 is provided immediately under the CIS 410 with a space from the CIS 410, and the document D that has been fed by the second feeding roller pair 45 passes between the CIS 410 and the reading guide 49.

The CIS 410 emits light to the second side of the document D (side facing the CIS 410) that passes immediately under the CIS 410, receives the reflected light from the second side of the document D, and generates image data corresponding to an image on the second side of the document D from the received reflected light by photoelectric conversion. The generated image data is transmitted to the image forming unit 2.

In this regard, the CIS 410 is a second reading unit for reading an image on the second side of the document D in sheet through type and a position 52 where the light from the CIS 410 is emitted to the second side of the document D is a second reading part for reading an image on the second side of the document D.

The document D that has passed the CIS 410 is fed to a pre-discharge roller pair 46. The pre-discharge roller pair 46 feeds the document D that has passed the CIS 410 toward a discharge roller pair 47, and the discharge roller pair 47 discharges the document D fed from the pre-discharge roller pair 46 on the document discharge tray 40*b*.

<Document Feeding Path>

As illustrated in FIG. 2, a path 60 from the first reading part 51 to a second reading part 52 out of the document feeding path 401 is an S-shaped path (hereinafter referred to as "S-shaped path") when seen from side (when seen from the document width direction orthogonal to the feeding direction of the document D).

Figure 3:
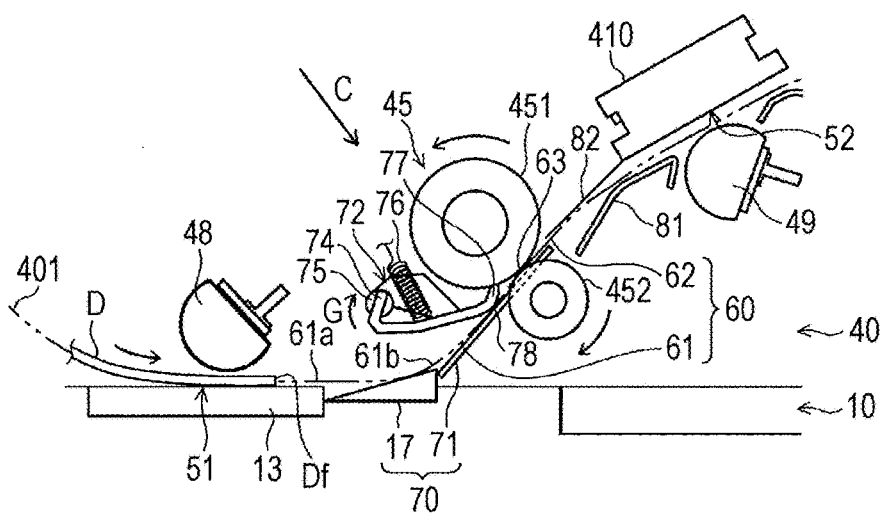
FIG. 3 is a view in which an S-shaped path included in the image reading device is enlarged.

FIG. 3 is a side view in which the S-shaped path 60 is enlarged.

As illustrated in FIG. 3, the S-shaped path 60 includes a first curved path 61 and a second curved path 62.

The first curved path 61 is a path that is curved obliquely upward toward the downstream side of the document feeding direction from the first reading part 51, and the second curved path 62 is a path that is curved to the side opposite to the first curved path 61. A connecting point 63 between the lower end of the first curved path 61 in the document feeding direction and the upper end of the second curved path 62 in the document feeding direction is an inflection point of the S-shaped path 60.

The document D that has passed the first reading part 51 is fed with the posture extending downward when passing the first curved path 61 and is fed with the posture extending upward when subsequently passing the second curved path 62.

The first curved path 61 is formed by a lower guide 70 including the pick-up guide 17 and the feeding guide 71 and the pressing guide 72 that is located above the feeding guide 71 and faces the feeding guide 71. The pick-up guide 17 and the feeding guide 71 are guides outside curve of the first curved path 61 and the pressing guide 72 is a guide inside curve of the first curved path 61. Each guide has constant length along the document feeding direction and is a plate member made of resin; however, each guide is not limited to resin and plate shape, and the material thereof may be metal, for example.

The pick-up guide 17 is provided adjacent to the glass for sheet through 13 at a position at the downstream side of the document feeding direction with respect to the glass for sheet through 13 and at the upstream side of the document feeding direction with respect to the feeding guide 71, picks up a tip Df of the document D that has come over the glass for sheet through 13 in the horizontal direction and passed the first reading part 51 upward, and causes the document D to go toward the feeding guide 71 above the first reading part 51. Note that, since the pick-up guide 17 is provided to the image reading unit 10 with the glass for sheet through 13, it remains in the image reading unit 10 even if the automatic document feeder 40 is open upward when the document is read by scanner movement type.

The feeding guide 71 guides the tip Df of the document D picked up by the pick-up guide 17 to the downstream side of the document feeding direction.

The pressing guide 72 is provided for preventing occurrence of skew to the document D that is being delivered through the S-shaped path 60 as well as for forming the first curved path 61, and supported by a device housing 40*c* (FIG. 4) so that it can sway in the direction indicated by an arrow G and the direction opposite thereto with the center being a rotation axis 75 provided to abase end section 74 at the upstream side of the document feeding direction.

In addition, a downward biasing force by a compression coil spring 76 as an example of biasing member is always applied to a position between the base end section 74 of the pressing guide 72 and an end at the downstream side of the document feeding direction (hereinafter referred to as "guide tip") 77.

A rotational force in the direction indicated by the arrow G is applied to the pressing guide 72 with the center being the rotation axis 75 by the biasing force by the compression coil spring 76 and own weight of the pressing guide 72, and the guide tip 77 presses the feeding guide 71 so as to always contact with the feeding guide 71 when the document D is not being fed. The length of the part of the guide tip 77 that contacts with the feeding guide 71 in the document feeding direction is about 5 mm, for example. The location where the guide tip 77 presses the feeding guide 71 is referred to as pressing position 78.

If the first curved path 61 is divided into a first path part 61*a* where the tip Df of the document D passes the first reading part 51 and the document D is picked up by the pick-up guide 17 and a second path part 61*b* where the document D is picked up by the pick-up guide and reaches a lower end 63 of the first curved path 61 in the document feeding direction, the pressing position 78 is provided in the middle of the second path part 61*b* where curvature is larger than the first path part 61*a*. The reason for providing the pressing position 78 in the second path part 61*b* will be described later.

When the tip Df of the document D reaches the pressing position 78 during delivery of the document D, the tip Df enters between the feeding guide 71 and the guide tip 77 resisting the pressing force of the guide tip 77 to the feeding guide 71, and the document D passes between the feeding guide 71 and the guide tip 77 and is fed to the second feeding roller pair 45.

The second feeding roller pair 45 includes an upper roller 451 and a lower roller 452.

Figure 4:
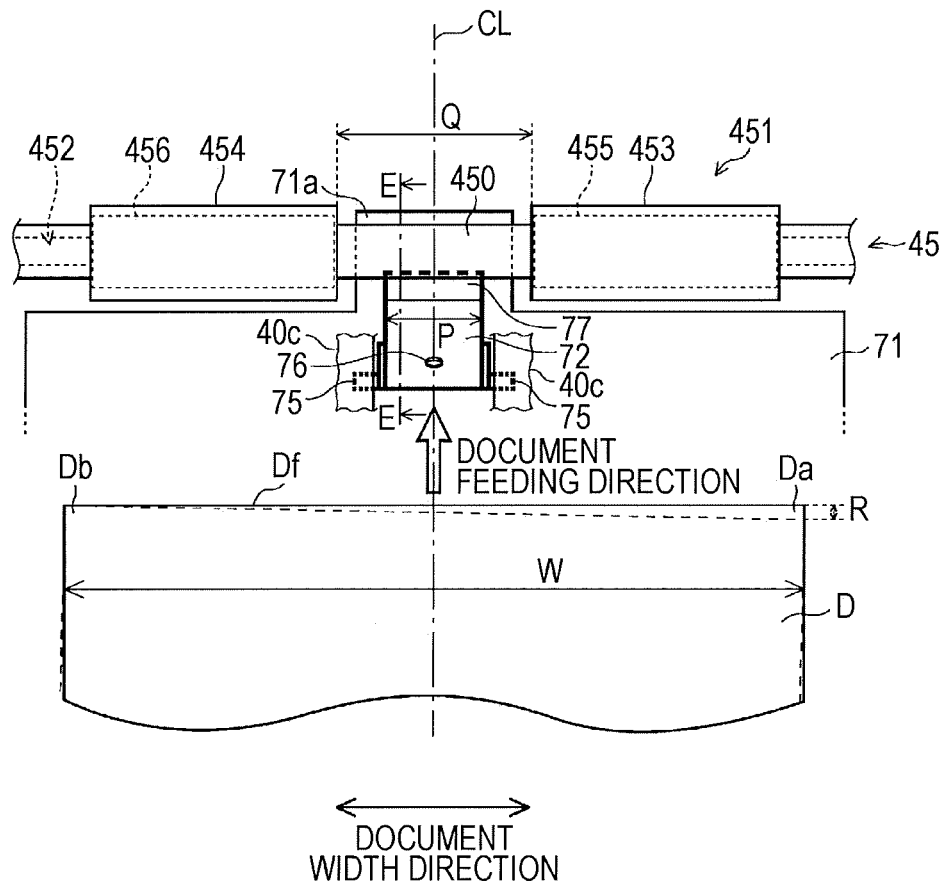
FIG. 4 is a plan view of a second feeding roller pair and a pressing guide seen from the direction indicated by an arrow C in FIG. 3.

FIG. 4 is a plan view illustrating the second feeding roller pair 45 and the pressing guide 72 seen from the direction indicated by an arrow C in FIG. 3, and also shows delivery of the document D toward the pressing guide 72.

Here, in FIG. 4, the center line indicating the center of the document feeding path in the width direction is indicated by CL, and the document D is delivered so that the center position of the document D in the document width direction is located on the center line CL with the reference being the center of the center line CL of the document feeding path regardless of the size of the document. The document width direction corresponds to the rotation axis direction of each feeding roller for feeding a document such as upper roller 451. Hereinafter, document width direction is referred to as width direction.

As illustrated in FIG. 4, the upper roller 451 includes two roller main bodies 453 and 454 provided to the rotation axis 450 with a space therebetween along the axis direction. The length of the roller main body 453 in the axis direction is the same as that of the roller main body 454. Note that, as with the upper roller 451, the lower roller 452 also includes two roller main bodies 455 and 456 (broken line). The roller main body 453 of the upper roller 451 is pressed against the roller main body 455 of the lower roller 452, and the roller main body 454 of the upper roller 451 is pressed against the roller main body 456 of the lower roller 452.

With respect to the pressing guide 72, the center position in the width direction is located on the center line CL, the rotation axes 75 extending from one end and another end in the width direction are rotatably supported by the device housing 40c, the length P in the width direction (for example, about 50 to 60 mm) is shorter than the distance Q between the roller main bodies 453 and 454 of the upper roller 451, and the guide tip 77 extends in the document feeding direction toward the position immediately under the rotation axis 450 of the upper roller 451. Similarly, with respect to the feeding guide 71 located below the pressing guide 72, the center part 71a in the width direction extends below the rotation axis 450 of the upper roller 451 in the document feeding direction.

Figure 5:
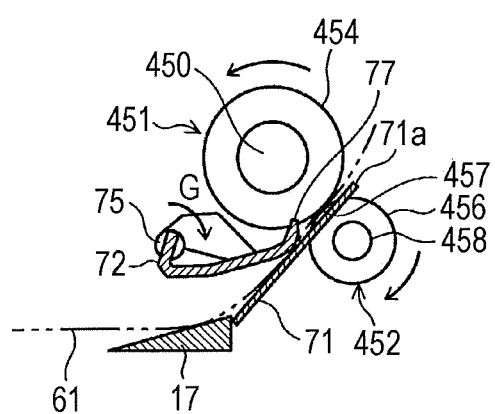
FIG. 5 is a cross-sectional view along line E-E shown in FIG. 4.

FIG. 5 is a cross-sectional view along line E-E shown in FIG. 4.

As illustrated in FIG. 5, the guide tip 77 is located to the upstream side of the document feeding direction with respect to a part (nip) 457 where the roller main body 454 is pressed against the roller main body 456, and it is clear that the upper roller 451 does not contact with the rotation axis 450, that is, the pressing guide 72 does not contact with the upper roller 451.

Similarly, a center part 71a of the feeding guide 71 in the width direction is located between the rotation axis 450 of the upper roller 451 and the rotation axis 458 of the lower roller 452, and it is clear that it does not contact with the upper roller 451 or the lower roller 452.

Returning to FIG. 3, the second curved path 62 includes a lower guide 81 and an upper guide 82 located above the lower guide 81 with a space from the lower guide 81, and each guide has a plate shape. The lower guide 81 and the upper guide 82 guide the document D that has passed the second feeding roller pair 45 to the second reading part 52.

<Document Delivery in the First Curved Path>

Figure 6A:
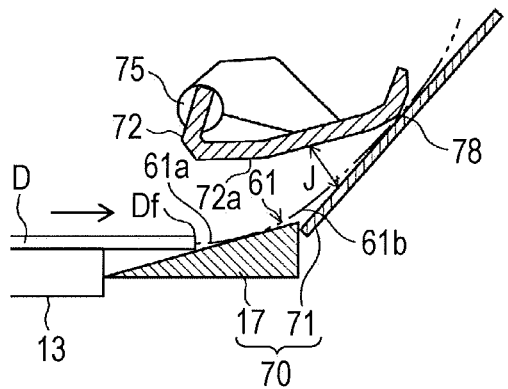
FIGS. 6A to 6C schematically illustrate a state in which a tip of a document that is being delivered is guided in a first curved path by a lower guide and the pressing guide.
Figure 6B:
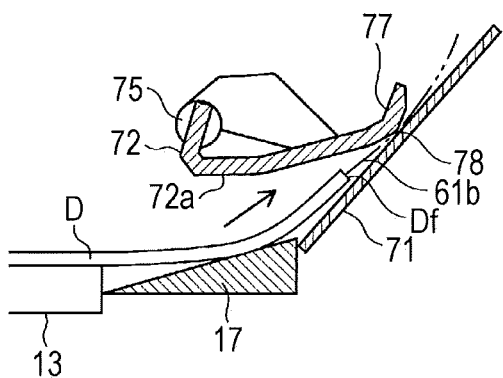
Figure 6C:
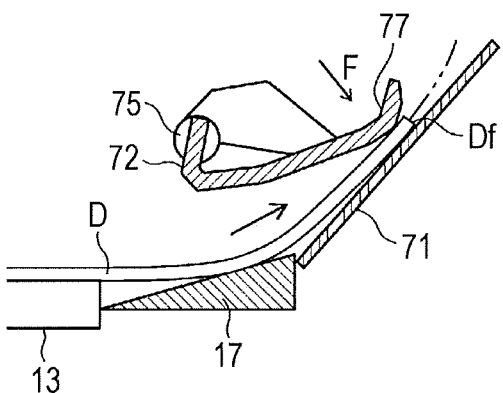

FIGS. 6A to 6C are side views schematically illustrating the tip Df of the document D that is being delivered guided in the first curved path 61.

FIG. 6A shows a state in which the tip Df of the document D that is being delivered contacts with the pick-up guide 17 immediately after passing over the glass for sheet through 13, and FIG. 6B shows a state in which the tip Df of the document D is picked up obliquely upward and moves forward after contacting with the pick-up guide 17.

As illustrated in FIGS. 6A and 6B, although the tip Df of the document D that is being delivered is picked up by the pick-up guide 17, flutter easily occurs to the tip Df of the document D that has been picked up by influence of contact with the pick-up guide 17. In addition, flutter sometimes occurs to the document D due to vibration during delivery even before the tip Df of the document D reaches the pick-up guide 17.

Although the flutter of the document D is a cause of occurrence of skew to the document D that is being delivered through the S-shaped path 60, occurrence of skew to the document D is prevented in the present embodiment with a function of the pressing guide 72 to prevent flutter of the document D.

Specifically, as illustrated in FIG. 6A, the pressing guide 72 is provided in a posture in which the distance J to the feeding guide 71 becomes narrow from the upstream toward the downstream of the document feeding direction. Accordingly, even if flutter occurs to the tip Df of the document D that has passed the pick-up guide 17, the flutter gradually becomes small as the tip Df moves forward between the feeding guide 71 and the pressing guide 72 (FIG. 6B).

Then, if the tip Df of the document D reaches the pressing position 78 where the distance J between the pressing guide 72 and the feeding guide 71 becomes narrowest, the state illustrated in FIG. 6C is obtained. That is, the tip Df of the document D resists the pressing force F toward the feeding guide 71 by the guide tip 77 of the pressing guide 72 and the guide tip 77 is pushed back in the direction away from the feeding guide 71 in an amount corresponding to the thickness of the document D, so that the tip Df of the document D enters between the feeding guide 71 and the guide tip 77 and passes between the feeding guide 71 and the guide tip 77.

Since the pressing force F by the pressing guide 72 against one document D continues to be applied while the document D passes between the feeding guide 71 and the guide tip 77, the document D is pressed against the feeding guide 71 by the pressing guide 72 when passing. In this regard, the pressing guide 72 functions as a pressing unit for pressing the document D that is being delivered.

With the pressing unit, it is possible to eliminate the flutter remaining to the tip Df of the document D or to reduce the flutter more than the case in which the pressing is not performed, and the document D is guided along the feeding guide 71 with the posture of the tip Df of the document D stable. Hereinafter, elimination or reduction of the flutter is referred to as "flutter is prevented."

That is, flutter, which is a cause of occurrence of skew to the document D, can be prevented in the first curved path 61 at the upstream side of the document feeding direction of the S-shaped path 60.

Specifically, the document D is pressed by the pressing guide 72 at the pressing position 78 at the second path part 61b that has a larger curvature, that is, that is more sharply curved upward, out of the first path part 61a and the second path part 61b of the first curved path 61. The reason of this structure is described below.

That is, contact pressure with the feeding guide 71 when the tip Df of the document D that is being delivered contacts with the feeding guide 71 and the feeding direction is changed further obliquely upward becomes stronger as the upward curve becomes sharper as in the second path part 61b as compared with moderate curve.

Therefore, if the document D continues to be guided while flutter is occurring in the second path part 61b with sharp curve, the contact pressure at one end Da (FIG. 4) of the document D in the width direction with the feeding guide 71 is strong and the contact pressure at the other end Db (FIG. 4) is weak or vice versa, for example. Therefore, difference in the feeding resistance easily occurs between one end Da and the other end Db, and this easily causes skew to the document D.

Then, occurrence of skew in the area from the first curved path 61 to the second reading part 52 via the second curved path 62 can be effectively prevented by preventing flutter, which is a cause of occurrence of skew, at the second path part 61b where skew occurs more easily than at the first path part 61a.

In addition, since the document D continues to be pressed by the pressing guide 72 until the rear end of the document D in the feeding direction has passed the pressing position 78, the document D is not away from the feeding guide 71 and does not flutter during delivery, and it is possible to prevent occurrence of new flutter to the document D after the tip Df of the document D has passed the feeding guide 71.

Accordingly, it is possible to prevent gradual increase of skew to the document D due to difference in the feeding resistance between the one end and the other end of the document D in the width direction by flutter while flutter is occurring while the document D is being delivered from the first curved path 61 to the second reading part 52 via the second curved path 62, and it is possible to prevent occurrence of skew to the document D due to delivery in the S-shaped path 60.

Note that, while flutter of the tip Df of the document D can be prevented easily as the pressing force F by the pressing guide 72 becomes large, document delivery may be influenced by large feeding resistance against the document D that is being delivered. In contrast, while influence to document delivery can be reduced if the pressing force F is excessively minimized, flutter of the tip Df of the document D may remain only with own weight of the pressing guide 72. On the other hand, if flutter of the document D can be reduced to some extent though not completely, skew with the size that reduces readability of a document image may not occur.

Therefore, the size of the pressing force F is determined in advance as appropriate for the device structure by an experiment or the like on the condition that readability of a document image is not lowered by skew and transportability of the document D is not affected, and a spring constant or the like of the compression coil spring 76, for example, is determined so that the pressing force F with the determined size is applied.

Figures 7, 8:
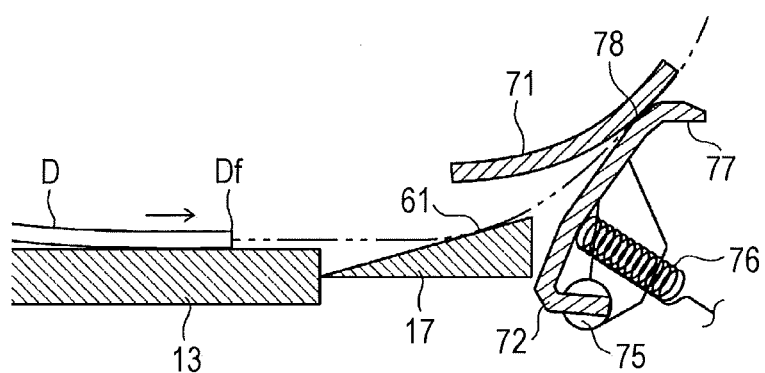
FIG. 7 shows results of experiments in accordance with Example, Comparative Example 1, Comparative Example 2, and Modification 1 in which the level of skew that occurs to a document that is being delivered through an S-shaped path is obtained.
FIG. 8 illustrates a structure according to Modification 2.
Figure 9:
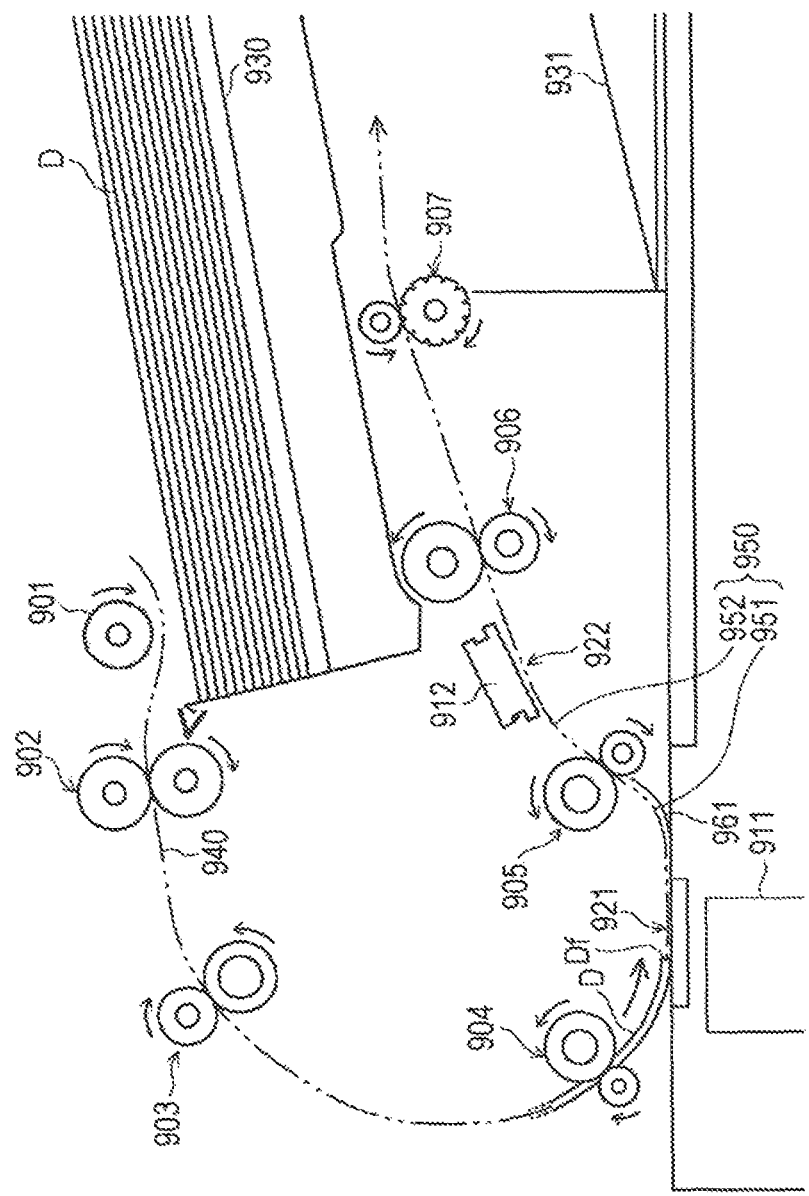
FIG. 9 illustrates a schematic structure of a double-sided image reading device.

FIG. 7 shows examples of results of experiments in structure of each of Example, Comparative Example 1, Comparative Example 2, and Modification 1 in which the level of skew that occurs to the document D that is being delivered through the S-shaped path 60 is obtained.

Here, Example refers to an example of the structure of the image reading device 1 according to the present embodiment.

Comparative Example 1 is an example of a structure in which the pressing guide 72 is removed from the image reading device 1 (corresponding to conventional structure), and Comparative Example 2 is an example of a structure in which the pressing guide 72 of the image reading device 1 is provided only to the second curved path 62 instead of the first curved path 61. In addition, Modification 1 is an example of a structure in which a guide member with the same function as the pressing guide 72 is provided to the second curved path 62 as well in the image reading device 1.

In addition, "difference α (%) in inclination of the tip of the front side and the back side of the document" shown in FIG. 7 is a value obtained by the following (formula 1).

$$\alpha = \beta 2 - \beta 1 \quad \text{(Formula 1)}$$

Here, $\beta 1$ represents a degree of inclination of the tip when the tip Df of the document D passes the first reading part 51, and $\beta 2$ represents a degree of inclination of the tip when the tip Df of the document D after passing the first reading part 51 passes the second reading part 52.

$\beta 1$ and $\beta 2$ can be obtained by the following (formula 2).

$$\beta = (R/W) \times 100 \quad \text{(Formula 2)}$$

Here, W represents the length of the document D in the width direction as shown in FIG. 4.

R represents an amount of displacement of one end of the tip Df of the document D in the width direction to which skew occurs (posture of broken line shown in FIG. 4) in the document feeding direction of the document D in the reference posture with respect to the tip Df with the reference posture being the state in which skew does not occur to the document D (posture of solid line shown in FIG. 4). When the amount of displacement R is 0, β becomes 0, which means that skew does not occur to the document D. The size of the amount of displacement R can be regarded as the size of skew.

Each time when one document D is being delivered, β1 is measured at the time when the tip Df of the document D passes the first reading part 51 and β2 is measured at the time when the tip Df of the document D passes the second reading part 52.

Normally, when skew occurs to the document D that is being delivered, the size of skew R gradually becomes large from the upstream side toward the downstream side of the document feeding direction, and the relation of β1<β2 is obtained in many cases. In this case, when (β2−β1) is a, a indicates the size of the skew that occurs when the document is being delivered through the S-shaped path 60 after the tip Df of one document D passes the first reading part 51. Therefore, it is possible to say that the size of the skew occurring to the document D that is being delivered through the S-shaped path 60 is small as the difference α is small.

In the results of the experiments shown in FIG. 7, while α is 0.0008 in Example in which the pressing guide 72 is provided, α is 0.1894 in Comparative Example 1 in which the pressing guide 72 is not provided, which means that the value of α in Comparative Example 1 is considerably larger than that in Example.

Therefore, it is clear that the size of skew R occurring to the document D that is being delivered through the S-shaped path 60 can be extremely smaller by providing the pressing guide 72 than the structure without the pressing guide 72.

In addition, in Comparative Example 2 in which the pressing guide 72 is provided only to the second curved path 62, the value of α is considerably larger (=0.2185) than Example. This is considered to be because of the following reason. That is, in Comparative Example 2, the pressing guide 72 is not provided to the first curved path 61. Therefore, it is not possible to prevent occurrence of skew to the document D that is being delivered through the first curved path 61, and it is considered that skew that has already occurred cannot be eliminated even if the document D that is being delivered through the second curved path 62 by the pressing guide 72 after skew has occurred.

From the result of Comparative Example 2, it is clear that occurrence of skew to the document D due to delivery through the S-shaped path 60 can be effectively prevented by providing the pressing guide 72 to the first curved path 61 at the upstream side of the document feeding direction out of the first curved path 61 and the second curved path 62 included in the S-shaped path 60.

This is also clear from the result of Modification 1 in which the pressing guide 72 is provided to both the first curved path 61 and the second curved path 62. That is, α in Modification 1 is significantly smaller than that in Comparative Examples 1 and 2, and effect of prevention of occurrence of skew by providing the pressing guide 72 to the first curved path 61 is apparent. Note that, although α in Modification 1 is little larger than that of Example, this is due to variation in the experiment results, and it is a value within an acceptance range that does not affect readability of a document image, which is also true for Example.

The pressing guide 435 that has the same function for preventing occurrence of skew as the pressing guide 72 is provided at a location between the registration roller pair 43 and the first feeding roller pair 44 as illustrated in FIG. 2. Basically, the structure of the pressing guide 435 is the same as that of the pressing guide 72.

Specifically, the pressing guide 435 is swingably supported by the device housing 40c in the direction indicated by an arrow T in FIG. 2 and the direction opposite thereto with the center being a rotation axis 436, and a guide tip 437 presses a curved feeding guide 438 by a biasing force of a compression coil spring (not illustrated) to contact with the feeding guide 438 unless the document D is not being delivered.

During delivery of the document D, the tip Df of the document D enters between the feeding guide 438 and the guide tip 437 resisting a pressing force of the guide tip 437 toward the feeding guide 438, and passes between the feeding guide 438 and the guide tip 437 while being pressed by the guide tip 437. Accordingly, since flutter is prevented by pressing of the pressing guide 435 even if flutter occurs to the tip Df of the document D immediately after passing the registration roller pair 43, occurrence of skew to the document D that is being delivered toward the first feeding roller pair 44 can be prevented.

As described above, in the present embodiment, the document D is pressed against the feeding guide 71 by the pressing guide 72 to prevent flutter even if flutter occurs to the document D after passing the first reading part 51 by providing the pressing guide 72 to the first curved path 61 at the upstream side of the document feeding direction of the S-shaped path 60. Accordingly, occurrence of skew to the document D that is being delivered can be prevented more than in a structure in which the document D continues to be fed through the S-shaped path 60 with large flutter due to non-provision of a pressing guide.

<Modification>

Although the present invention has been described above based on embodiments, it is needless to say that the present invention is not limited to the embodiments described above and the following modifications can be considered.

(1) Although the pressing guide 72 is swingably supported with the center being the rotation axis 75 in the embodiments described above, the present invention is not limited thereto.

Any structure is acceptable as long as the guide tip 77 contacts with the second side of the document D and presses the document D in the direction toward the feeding guide 71 when the document D that is being delivered passes between the pressing guide 72 and the feeding guide 71.

For example, a structure in which the entire pressing guide 72 can move parallel in the direction toward and away from the feeding guide 71 is acceptable. Also with this structure, if a biasing member for biasing the pressing guide 72 toward the feeding guide 71 such as a spring is provided, it is possible to press the document D against the feeding guide 71 by the guide tip 77 with a biasing force of the biasing member when the document D that is being delivered passes between the guide tip 77 and the feeding guide 71.

In addition, even if a biasing force of the biasing member is not applied to the pressing guide 72, a biasing member may not be provided if it is possible to press the document D that is being delivered only by own weight of the pressing guide 72, for example.

Moreover, the base end section 74 of the pressing guide 72 may be fixed to and supported by the device housing 40c so that the flexible guide tip 77 contacts with the feeding guide 71 to be fixed at bent posture. A restoring force applying to the pressing guide 72 in the bent posture can be used instead of the biasing force of the compression coil spring 76.

In addition, although an example of a structure in which the guide tip 77 contacts with the feeding guide 71 when the document D is not being delivered has been described above, the present invention is not limited thereto. It is only required to press the document D that is being delivered by the guide tip 77. For example, it is possible to prevent a stopper for regulating the rotation range of the rotation axis 75 of the pressing guide 72 so that there is a gap smaller than the thickness of the document D between the guide tip 77 and the feeding guide 71 (floating state) when the document D is not being delivered, for example.

Moreover, although an example of a structure in which the pick-up guide 17 is a different member from the feeding guide 71 has been described above, the present invention is not limited thereto, and a member integrating the pick-up guide 17 and the feeding guide 71 can be used for a device structure of only sheet through type, for example.

(2) In addition, although an example of a structure in which one pressing guide 72 is located on the center line CL of the document feeding path 401 in the structure in which the document D is fed on the document feeding path 401 as a reference has been described in above embodiments, the present invention is not limited thereto. For example, two pressing guides 72 may be provided with the center line CL in between with equal distance from the center line CL. In this case, it is preferable that the pressing force of one of two pressing guides 72 be the same or substantially same as that of the other pressing guide 72. In addition, three or more pressing guides 72 may be provided along the width direction of the document D with distance from one another.

Furthermore, in a structure in which the document D is fed with the reference being one end of the document feeding path 401 in the width direction, that is, with one side reference instead of center reference, the pressing guide 72 may be provided to a position corresponding to the center of the document D of minimum size in the width direction when the document D in minimum size to the extent possible to feed is to be fed.

(3) Moreover, although an example of a structure with the positional relationship of the feeding guide 71 and the pressing guide 72 in which the feeding guide 71 is provided lower and the pressing guide 72 is provided upper has been described in the above embodiments, the present invention is not limited thereto. For example, as in Modification 2 illustrated in FIG. 8, the feeding guide 71 may be provided upper and the pressing guide 72 may be provided lower.

In Modification 2, the pressing guide 72 is a guide outside the curve of the first curved path 61, and the feeding guide 71 is a guide inside the curve of the first curved path 61. In addition, the pressing guide 72 provided lower presses the feeding guide 71 provided upper by a biasing force of the compression coil spring 76 instead of own weight of the pressing guide 72. Flutter of the document D can be eliminated by pressing the tip Df of the document D picked up by the pick-up guide 17 against the feeding guide 71 from the lower side by the guide tip 77.

(4) Although an example of a structure in which the second feeding roller pair 45 is provided at a position corresponding to the inflexion point 63 of the S-shaped path 60 has been described in the above embodiments, the position to provide the second feeding roller pair 45 is not limited to the position described above. The second feeding roller pair 45 may be provided in the middle of the S-shaped path 60 and at a position appropriate for feeding the document D after passing the first reading part 51 toward the second reading part 52.

Even if the location to provide the second feeding roller pair 45 is changed, the positional relationship with the pressing guide 72 is basically maintained to the relationship in which the pressing guide 72 is located in the middle of the first curved path 61 and at the upstream side with respect to the second feeding roller pair 45 in the document feeding direction.

Note that, if the second feeding roller pair 45 is provided to the upper end of the first curved path 61 in the document feeding direction and flutter occurs to the document D after passing the second feeding roller pair 45, the pressing guide 72 may be provided in the middle of the first curved path 61 and at the downstream side with respect to the second feeding roller pair 45 in the document feeding direction in order to eliminate the flutter.

In addition, although the second feeding roller pair 45 is not provided depending on the device structure in some cases, skew occurring to the document D while it is being delivered through the S-shaped path 60 can be prevented by providing the pressing guide 72 to the first curved path 61 in such a case as with the above.

(5) Moreover, although an example of a structure in which the document D is pressed by the pressing guide 72 at the downstream side of the document feeding direction and in the middle of the second path part 61*b* with larger curvature out of the first path part 61*a* and the second path part 61*b* in the first curved path 61 has been described in the above embodiments, the present invention is not limited thereto. It is only required to prevent flutter of the document, which is a cause of occurrence of skew, while the document D is being delivered through the first curved path 61. The document D may be pressed in the middle of the first path part 61*a*, for example, depending on the device structure.

In addition, if the curvature of the first path part 61*a* is larger than that of the second path part 61*b* for example, the document D may be pressed by the pressing guide 72 in the middle of the first path part 61*a* at the upstream side of the document feeding direction. That is, when the first curved path 61 is formed by connecting several path parts (including straight path parts) with different curvature, the document D can be pressed at the path part with the largest curvature.

(6) Although an example of a structure in which the image reading device 1 as a double-sided image reading device according to an embodiment of the present invention is provided to an MFP has been described in the above embodiments, the present invention is not limited thereto, and the image reading device 1 may be provided as a double-sided image reading device of an image forming device such as MFP and copy machine.

In addition, although an example of a structure in which the first reading unit for reading an image on the first side of a document is the image reading unit 10 including the first slider 18 and the second slider 19 and the second reading unit for reading an image on the second side of the document is the CIS 410 has been described, the present invention is not limited thereto. For example, the first reading unit may also be a CIS.

Moreover, a double-sided image reading device according to an embodiment of the present invention can be used as a device for reading an image only such as scanner that reads images on both sides of a document instead of being provided to an image forming device. In addition, the shape, size, number, material, and the like of each member such as the feeding guide 71 and the pressing guide 72 described above are not limited to those described above, and shape and the like appropriate for the device structure are used.

Furthermore, the structures of the above embodiments and the above Modification may be combined to the extent possible.

Embodiments of the present invention can be widely applied to a double-sided image reading device for reading an image on a document and an image forming device including such double-sided image reading device.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A double-sided image reading device that reads an image on a first side of a document when the document that is being delivered through a feeding path passes a first reading part and thereafter reads an image on a second side of the document opposite to the first side when the document passes a second reading part, the double-sided image reading device comprising:

an S-shaped path provided between the first reading part and the second reading part of the feeding path and including a lower end of a first curved path in a document feeding direction and an upper end of a second curved path curved to the side opposite to the first curved path in the document feeding direction connected to each other;

a feeding rotational member that is provided in the middle of the S-shaped path and feeds the document that is being delivered through the S-shaped path toward a downstream side of the document feeding direction; and a pressing guide configured to press the document that is being delivered through the first curved path, wherein the pressing guide first presses the document after the document begins to bend after passing the first reading part, and is provided at an upstream side of the document feeding direction with respect to the feeding rotational member.

2. The double-sided image reading device according to claim 1, further comprising a feeding guide that faces the pressing guide with the document that is being delivered in between, wherein at least a part of the first curved path is formed by the feeding guide and the pressing guide, and the pressing guide presses the document that passes between the pressing guide and the feeding guide against the feeding guide.

3. The double-sided image reading device according to claim 2, wherein the pressing guide has a part a distance from which to the feeding guide becomes narrower from an upstream side toward a downstream side of the document feeding direction, and the pressing guide presses the document against the feeding guide at a part at the downstream side of the document feeding direction where the distance to the feeding guide becomes the narrowest.

4. The double-sided image reading device according to claim 2, wherein the pressing guide uses at least one of own weight and a biasing force of a biasing member as a pressing force for pressing the document against the feeding guide.

5. The double-sided image reading device according to claim 2, further comprising a pick-up guide provided to a downstream side of the document feeding direction with respect to the first reading part and an upstream side of the document feeding direction with respect to the feeding guide, wherein the pick-up guide picks up the document that has passed the first reading part and causes the document to move toward the feeding guide.

6. The double-sided image reading device according to claim 5, wherein the first curved path includes a first path part where the document that has passed the first reading part is picked up by the pick-up guide and a second path part between the part where the document is picked up by the pick-up guide and a lower end of the first curved path in the document feeding direction, and a curvature of the second path part is larger than that of the first path part.

7. The double-sided image reading device according to claim 2, wherein the feeding guide is a guide outside a curve of the first curved path and the pressing guide is a guide inside the curve of the first curved path.

8. The double-sided image reading device according to claim 2, wherein the pressing guide presses the document that passes between the pressing guide and the feeding guide only against the feeding guide.

9. The double-sided image reading device according to claim 1, wherein the first curved path includes a first path part and a second path part that is provided at a downstream side of the document feeding direction with respect to the first path part and has a curvature different from that of the first path part, and the pressing guide presses the document that is being delivered through the path part with a larger curvature.

10. The double-sided image reading device according to claim 1, further comprising a registration roller pair that is provided at an upstream side of the document feeding direction with respect to the first reading part of the feeding path and eliminates skew of the document that is fed toward the first reading part.

11. An image forming device that forms an image on a sheet on the basis of image data of a document read by a double-sided image reading unit, wherein the double-sided image reading unit reads an image on a first side of the document when the document that is being delivered through a feeding path passes a first reading part and thereafter reads an image on a second side of the document opposite to the first side when the document passes a second reading part, and the double-sided image reading unit comprises:

an S-shaped path provided between the first reading part and the second reading part of the feeding path and including a lower end of a first curved path in a document feeding direction and an upper end of a second curved path curved to the side opposite to the first curved path in the document feeding direction connected to each other;

a feeding rotational member that is provided in the middle of the S-shaped path and feeds the document that is being delivered through the S-shaped path toward a downstream side of the document feeding direction; and a pressing guide configured to press the document that is being delivered through the first curved path, wherein the pressing guide first presses the document after the document begins to bend after passing the first reading part, and is provided at an upstream side of the document feeding direction with respect to the feeding rotational member.

12. The image forming device according to claim 11, wherein the double-sided image reading unit further comprises a feeding guide that faces the pressing guide with the document that is being delivered in between, at least a part of the first curved path is formed by the feeding guide and the pressing guide, and the pressing guide presses the document that passes between the pressing guide and the feeding guide against the feeding guide.

13. The image forming device according to claim 12, wherein the double-sided image reading unit has a part where a distance between the pressing guide and the feeding guide becomes narrower from an upstream side toward a downstream side of the document feeding direction, and the pressing guide presses the document against the feeding guide at a part at the downstream side of the document feeding direction where the distance to the feeding guide becomes the narrowest.

14. The image forming device according to claim 12, wherein in the double-sided image reading unit, the pressing guide uses at least one of own weight and a biasing force of a biasing member as a pressing force for pressing the document against the feeding guide.

15. The image forming device according to claim 12, wherein
the double-sided image reading unit further comprises a pick-up guide provided to a downstream side of the document feeding direction with respect to the first reading part and an upstream side of the document feeding direction with respect to the feeding guide, and
the pick-up guide picks up the document that has passed the first reading part and causes the document to move toward the feeding guide.

16. The image forming device according to claim 15, wherein, in the double-sided image reading unit,
the first curved path includes a first path part where the document that has passed the first reading part is picked up by the pick-up guide and a second path part between the part where the document is picked up by the pick-up guide and a lower end of the first curved path in the document feeding direction, and
a curvature of the second path part is larger than that of the first path part.

17. The image forming device according to claim 12, wherein, in the double-sided image reading unit,
the feeding guide is a guide outside a curve of the first curved path and the pressing guide is a guide inside the curve of the first curved path.

18. The image forming device according to claim 11, wherein, in the double-sided image reading unit,
the first curved path includes a first path part and a second path part that is provided at a downstream side of the document feeding direction with respect to the first path part and has a curvature different from that of the first path part, and
the pressing guide presses the document that is being delivered through the path part with a larger curvature.

19. The image forming device according to claim 11, wherein,
the double-sided image reading unit further comprises a registration roller pair that is provided at an upstream side of the document feeding direction with respect to the first reading part of the feeding path and eliminates skew of the document that is fed toward the first reading part.

* * * * *